United States Patent [19]
Myers et al.

[11] Patent Number: 6,109,477
[45] Date of Patent: Aug. 29, 2000

[54] SIGNATURE PULSE GENERATOR AND METHOD OF DETECTING TAMPERING WITH A FUELING OPERATION

[75] Inventors: Howard M. Myers, Greensboro; John J. Ronchetti, Sr., Kernersville; Randall O. Watkins, Stokesdale, all of N.C.

[73] Assignee: Marconi Commerce Systems Inc., Greensboro, N.C.

[21] Appl. No.: 09/282,897

[22] Filed: Mar. 31, 1999

[51] Int. Cl.⁷ ................................................ B67D 5/00
[52] U.S. Cl. ........................... 222/1; 222/71; 250/231.14
[58] Field of Search ..................... 222/1, 71; 250/231.14

[56] References Cited

U.S. PATENT DOCUMENTS

| | | | |
|---|---|---|---|
| 3,814,934 | 6/1974 | Mesh et al. | 250/231 SE |
| 3,841,938 | 10/1974 | Grosse-Holling et al. | 156/293 |
| 4,096,383 | 6/1978 | Mancini et al. | 250/231 SE |
| 4,319,128 | 3/1982 | Dow, Jr. et al. | 222/30 |
| 4,661,691 | 4/1987 | Halpern | 235/375 |
| 4,728,788 | 3/1988 | Myers et al. | 250/231 |
| 4,920,259 | 4/1990 | Epstein | 250/237.13 |
| 5,235,177 | 8/1993 | Hutchinson et al. | 250/255 |
| 5,428,445 | 6/1995 | Holzapfel | 356/356 |
| 5,471,054 | 11/1995 | Watanabe | 250/231.13 |
| 5,569,906 | 10/1996 | Wong | 250/205 |
| 5,602,745 | 2/1997 | Atchley et al. | 364/464.23 |
| 5,874,732 | 2/1999 | Giles | 250/231.17 |
| 5,965,825 | 10/1999 | Nitecki | 222/71 |

*Primary Examiner*—J. Casimer Jacyna
*Attorney, Agent, or Firm*—Coats & Bennett, P.L.L.C.

[57] ABSTRACT

A method and apparatus for detecting tampering with a fuel dispenser digital pulse stream during dispensing of a fuel. The method includes generating a digital pulse stream indicative of the volume and flow rate of fuel dispensed wherein the pulse stream includes an identifying pulse anomaly; storing a digital pulse stream signature in a memory device wherein the stored signature includes the identifying pulse anomaly; comparing the incoming digital pulse stream with the stored digital pulse stream; and allowing fuel delivery to continue if the incoming digital pulse stream generated by the pulse generator is substantially similar to the stored digital pulse stream signature.

15 Claims, 17 Drawing Sheets

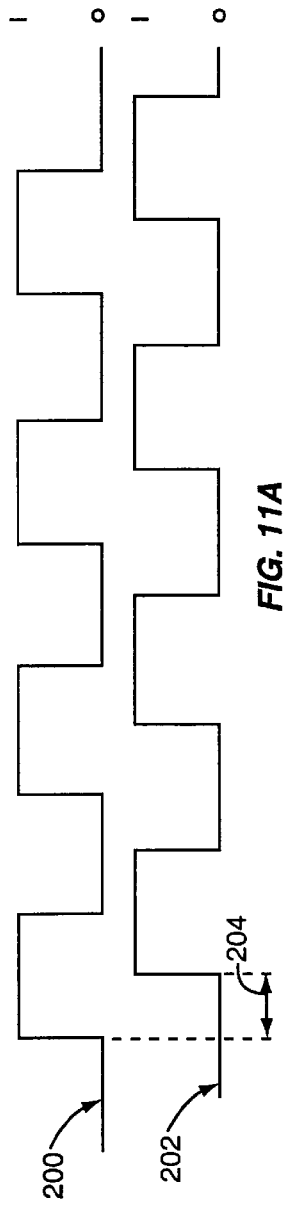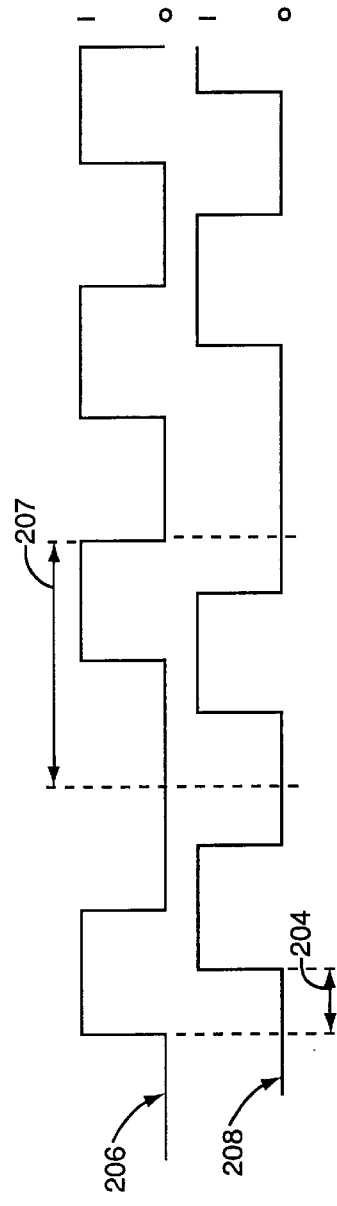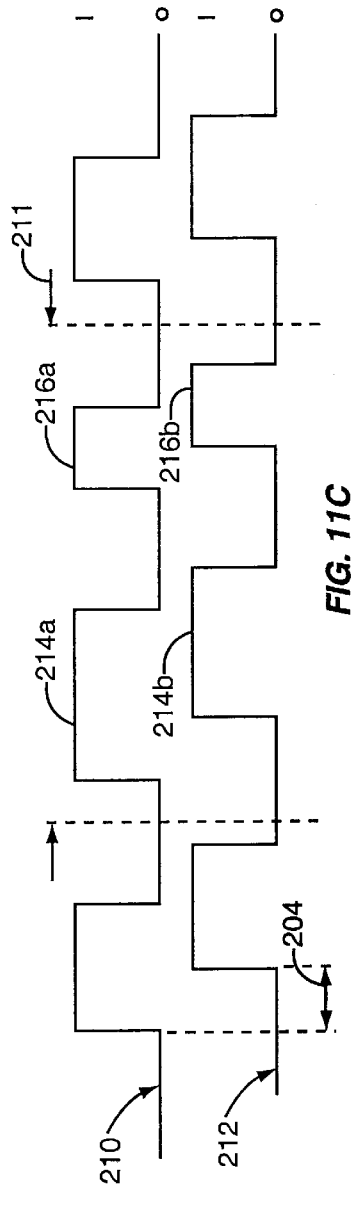

SIGNATURE PULSE GENERATOR AND METHOD OF DETECTING TAMPERING WITH A FUELING OPERATION

FIELD OF THE INVENTION

The present invention relates to managing a digital pulse stream to prevent tampering with the accuracy of the data represented by the pulse stream. More particularly, the invention relates to a pulse generator capable of creating a signature pulse stream that must be recognized as such for proper operation of a fuel dispensing system.

BACKGROUND OF THE INVENTION

Modern service station fuel dispensers monitor the amount of fuel delivered to a customer's vehicle by counting the number of pulses in a digital pulse stream generated by a device commonly called a "pulser." This arrangement is illustrated in the schematic representation of a dispenser 40 as shown in FIG. 1. The pulser 10 typically is mounted on the dispenser meter 8 and is connected to the meter 8 via a mechanical linkage. This arrangement is conventional in the field. The pulser 10 generates an electronic signal such as a digital pulse stream which has a pulse rate that is proportional to the flow rate of the product flowing through the dispenser during a particular fueling operation. Each pulse represents a known volume, so that the pulse rate is proportional to the volumetric rate. This information is processed by the dispenser electronics 14 to create a customer display of the total volume of product dispensed and possibly to control the certain dispenser operations such as blending processes.

In some parts of the world incidences of tampering with this pulse stream have occurred. This tampering consists of installing an additional signal generator 11 or "black box" between the pulser 10 and the dispenser electronics 14 to add false pulses to the pulse stream before it is received in the dispenser electronics 14. The effect of this pulse stream modification is to cause the customer to be overcharged for his purchase. Because the pulse stream is a very simple signal, creating the electronics necessary for this type of deception is straightforward.

There is a need for a modification to the pulser 10 and the dispenser electronics 14 to detect when the deception described above has taken place, to alert operating personnel and, if necessary, halt fueling operations.

SUMMARY OF THE INVENTION

The present invention relates to methods and fuel dispensing equipment intended to detect tampering with a fuel dispensing operation. Advantageously, the present invention carries out this function without revealing the fact that ongoing fueling operations are being monitored for tampering. Each fuel dispenser will be provided the capability to generate a characteristic identifying anomaly whose presence must be detected in order to continue fueling operations. Desirably, the present invention also provides for off-site monitoring of fueling operations to thwart the involvement of any onsite operator personnel.

The present invention relates to a method for detecting tampering with a fueling operation including generating an electronic signal as a fuel is dispensed to a customer. The electronic signal has an identifying anomaly, and the signal is related to the volume or flow rate of the fuel being dispensed. The generated signal is compared to an expected signal signature, which may be stored in a memory device. Fuel dispensing is permitted to continue if the generated signal including the anomaly is substantially similar to the expected signal signature. Alternatively, fuel dispensing may be stopped if the generated signal anomaly is not substantially similar to the expected signal signature.

The generated signal may include either a digital pulse stream indicative of the volume and flow rate of fuel dispensed or, alternatively, may include a signal indicative of a fuel flow rate variation characteristics of a particular meter. It has been discovered that this variation is characteristic of a particular flow meter and that the variation may be related to an expected amount of fuel dispensed. The scope of the present invention includes using both approaches.

The present invention further relates to a method for detecting tampering with a fuel dispensing operation. The method includes generating a digital pulse stream related to the volume or flow rate of fuel dispensed wherein the pulse stream includes an identifying pulse anomaly. An expected digital pulse stream signature is stored in a memory device, and the incoming digital pulse stream anomaly is compared with the expected digital pulse stream signature. If the digital pulse stream anomaly is substantially similar to the pulse stream signature, then fuel delivery is allowed to continue. The method may further include determining the rate at which fuel is being dispensed. If that rate is equal to or higher than a predetermined minimum, then the comparing and allowing steps described above are permitted to continue.

The identifying pulse anomaly may take alternative forms. In one embodiment it may comprise a first set of pulses having a first size and at least one pulse having a different size from that of the first set of pulses. In an alternative embodiment, the identifying anomaly may include a first set of pulses having a first size and a second set of pulses having a different size from that of the first set of pulses. In this embodiment the second set of pulses is preferably interspersed among ones of the first set.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed. The accompanying drawings, which are incorporated in and constitute a part of this specification, illustrate specific embodiments of the invention and, together with the description, serve to explain the principles of the invention, but the invention is not limited to these embodiments.

BRIEF DESCRIPTION OF THE DRAWINGS

The above and other objects, features, and advantages of the present invention will be more clearly understood from the following detailed description taken in conjunction with the accompanying drawings, in which:

FIGS. 11A–11C are schematic representations of dual channel pulse trains developed by an encoder wheel having two sets of apertures;

DETAILED DESCRIPTION OF THE PREFERRED EMBODIMENT

Figure 1:
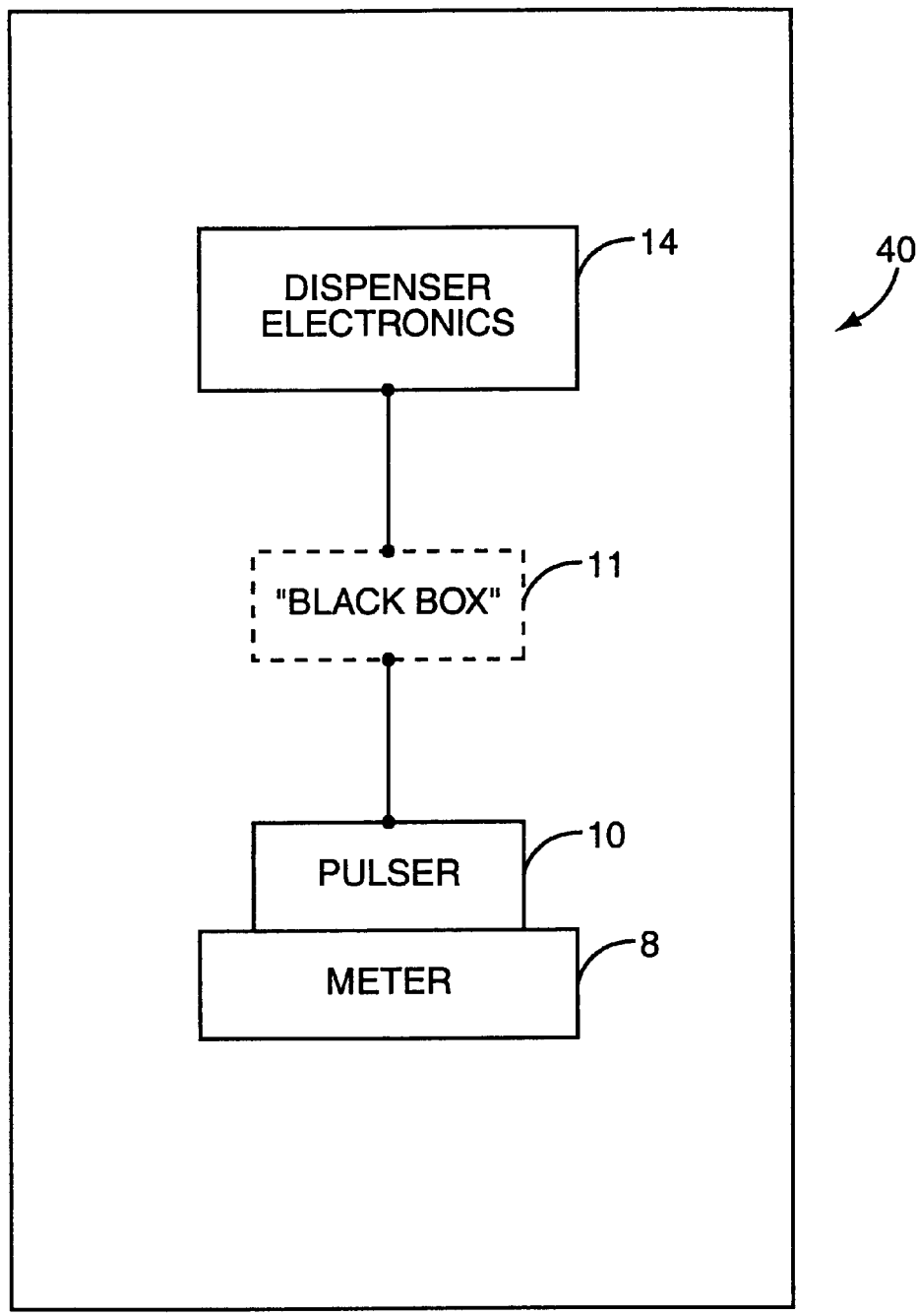
FIG. 1 is a block diagram of a fuel dispenser according to the prior art.
Figure 2A:
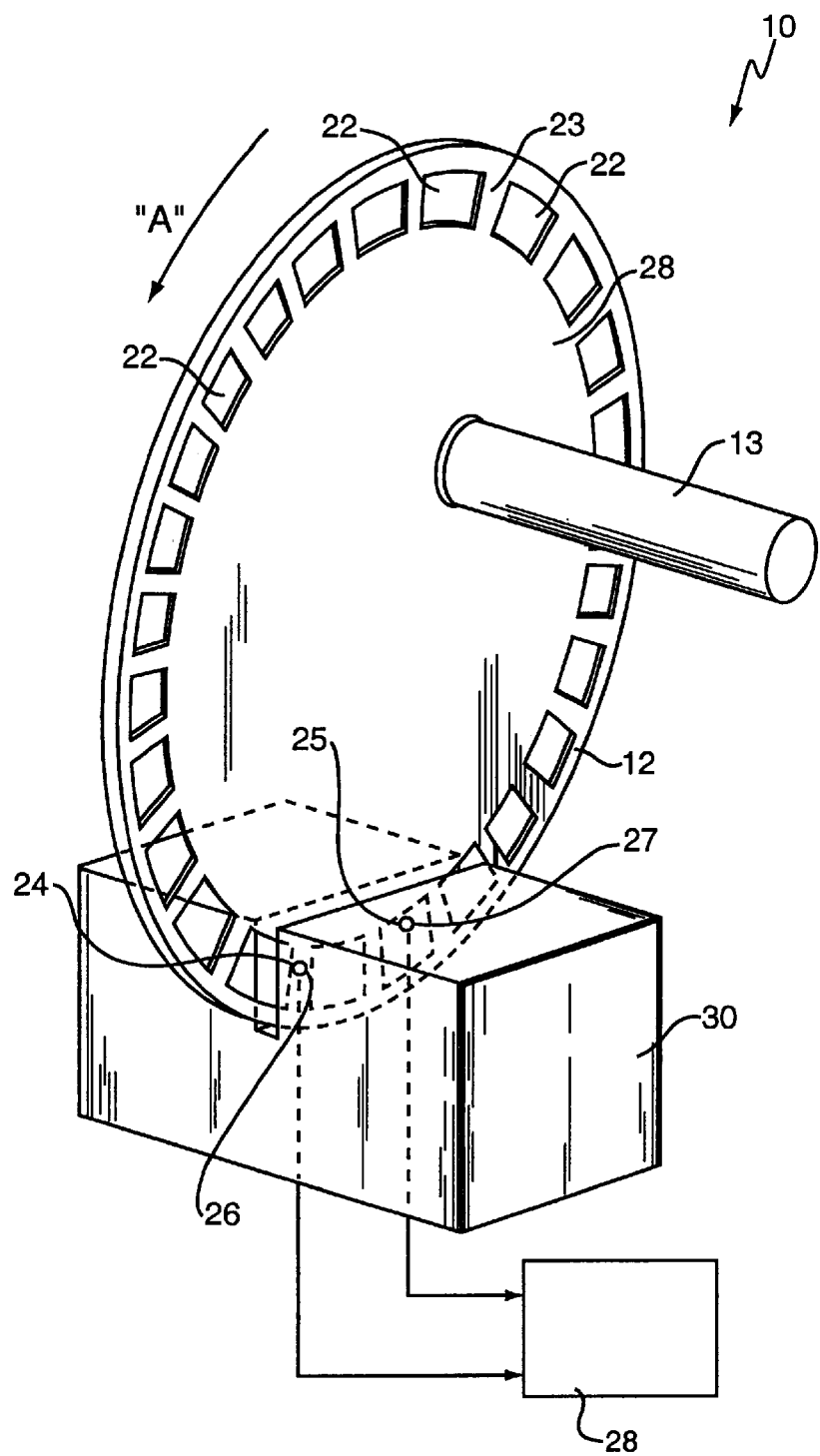
FIG. 2A is a perspective view of a pulser having an encoder wheel used in conventional modern gasoline dispensers.
Figure 2B:
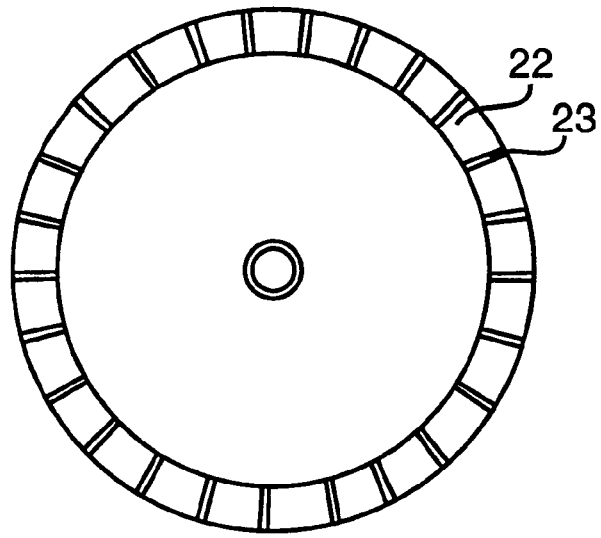
FIG. 2B is a plan view of the encoder wheel shown in FIG. 2A.

A typical pulser arrangement is shown schematically in FIG. 2A. A pulser, shown generally at 10, includes an encoder wheel 12 operatively connected to a meter output shaft 13. As is also shown in FIG. 2B, the periphery of the encoder wheel 12 contains a plurality of apertures 22 defined by spokes 23. In this example the encoder wheel 12 contains twenty-four equally sized apertures 22. However, the number of apertures may vary depending on the application. The term "aperture," as used herein should be understood to include not only an opening in encoder wheel 12, but also a transparent region which allows the passage of light or other energy source used in the present invention. Further, the term "spoke," as used herein should be understood to include an opaque region that prevents or otherwise inhibits the passage of light or other energy.

Referring again to FIG. 2A, a pair of light sources 24 and 25 is mounted on one side of the encoder wheel 12 so as to illuminate a pair of respectively aligned detectors 26 and 27, mounted on the opposite side of the encoder wheel 12. The light sources 24,25 (hereinafter referred to as a pair of light beams), and detectors 26,27 are positioned in a housing 30 so that detector 26 responds only to light emitting from beam 24, and detector 27 responds only to light emitting from beam 25. The light beams 24,25 may include Light Emitting Diodes (LED's), and the detectors 26,27 may include phototransistors.

It will be readily understood that as encoder wheel 12 rotates in the direction indicated by arrow "A," the spokes 23 defining apertures 22 will periodically interrupt light beams 24,25. The light beams 24,25 and detectors 26,27 are usually spaced from each other so that when the encoder wheel 12 is at a position such that a shadow is cast by a spoke 23 on detector 26, light propagates from light beam 25 onto detector 27 through the aperture 22. The stated arrangement ensures that the pulser will not fail because an error is detected if both light beams 26,27 are ever blocked by a spoke 23.

Figure 3:
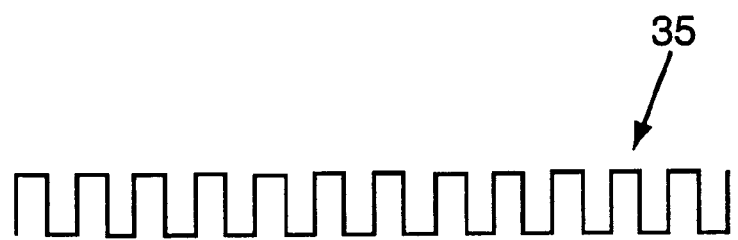
FIG. 3 is an illustration of a simple pulse stream generated by the pulser of FIG. 2A.

The apertures 22 are equally sized and spaced about the periphery of encoder wheel 12 so that the detectors 26,27 generate digital signals that have pulses at regular intervals if the wheel rotates at a constant speed. The digital signals are supplied to a circuit 28 that generates a simple digital pulse stream 35 (FIG. 3), indicative of the amount of rotation of the encoder wheel 12. The magnitude or voltage of the pulses in the stream will not vary. However, the pulse frequency or number of pulses generated during a unit of time may vary. Some dispensers begin a customer fueling operation at a slow flow rate and then increase that flow rate after some preset amount of product is dispensed. Also the flow rate is usually dependent on the degree of opening of a valve in a dispensing nozzle.

By way of non-limiting example, assuming the pulser is arranged to generate 1,000 pulses per gallon (or some other unit of measure) of fuel dispensed, then the number of pulses generated per minute will increase as flow rate is increased from 5 gal./min. (5,000 pulses/min.) to 10 gal./min. (10,000 pulses/min.). This frequency change is not an impediment for measuring volume dispensed because that function is more concerned with counting the number of pulses generated rather than the rate at which they are generated. By way of example, if a dispenser is preset to deliver ten gallons of fuel, then, using the scheme above, the dispenser electronics will permit product to be delivered while counting pulses until 10,000 pulses have been counted. The rate at which those pulses are delivered to the dispenser electronics typically is not critical to carrying out this function.

The discussion above is intended as a very general overview of dispenser pulse generating devices. A more detailed description is contained in U.S. Pat. Nos. 3,814,934; 4,096,383; and 4,728,788 (the '788 patent) the content of which is incorporated herein by reference. The description of the present invention contained herein presumes a working knowledge of invention disclosed in the '788 patent wherein a pair of light beams 24,25 are used to generate the pulse stream and to provide a fail-safe feature.

Figure 4A:
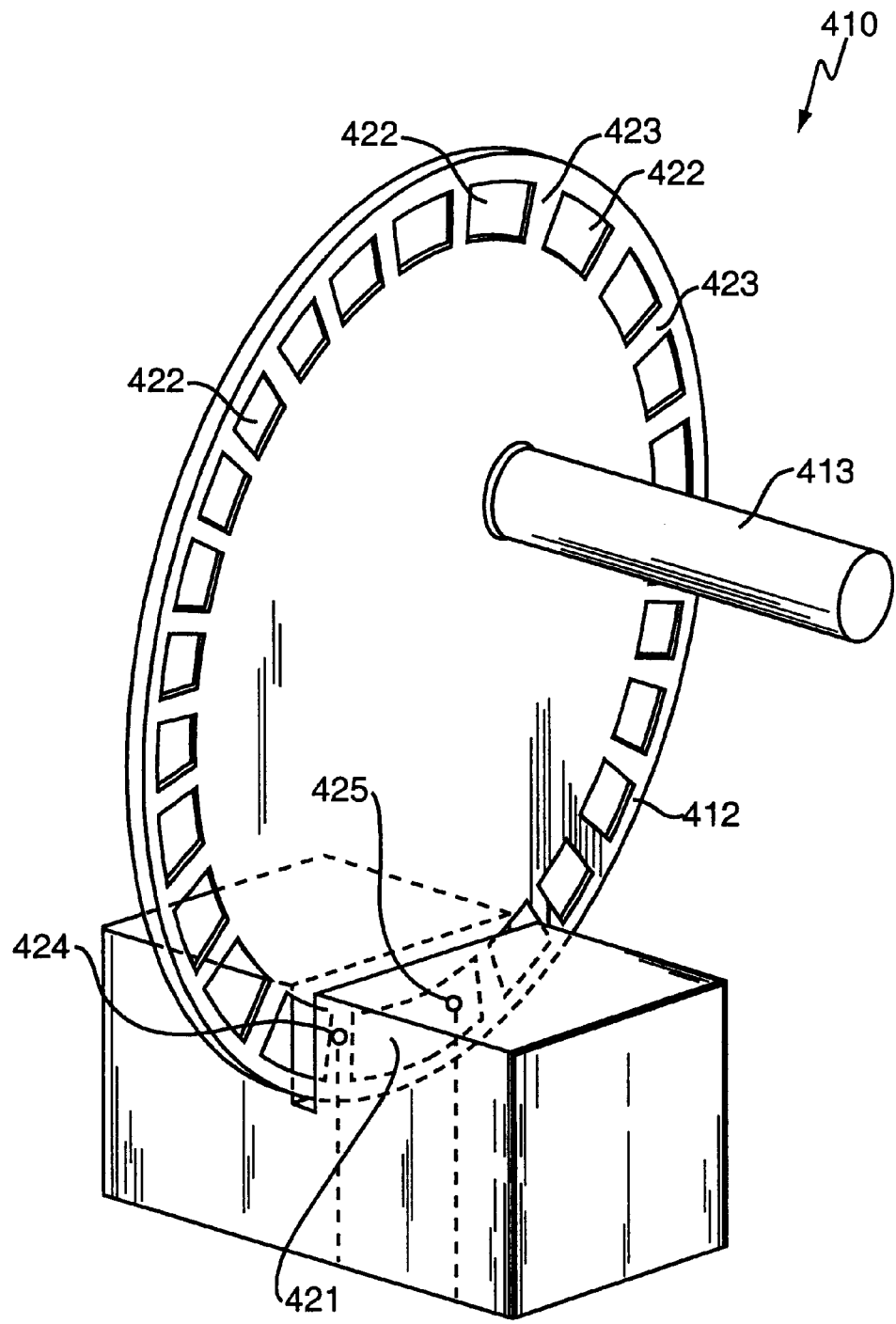
FIG. 4A is a perspective view of a pulser having an encoder wheel used to create a signature pulse stream.
Figure 4B:
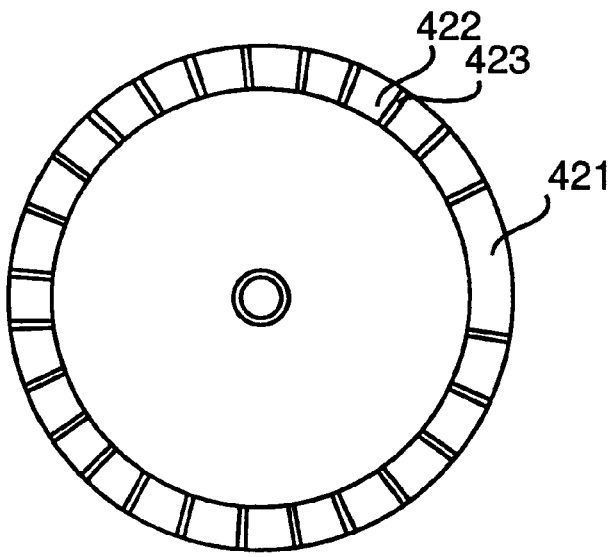
FIG. 4B is a plan view of the encoder wheel shown in FIG. 4A.
Figure 5:
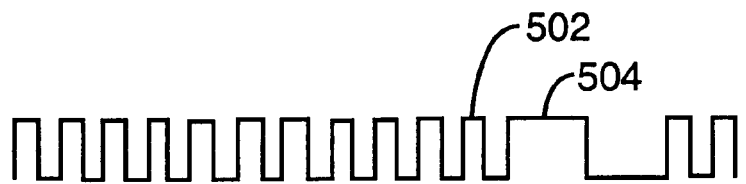
FIG. 5 is an illustration of the signature pulse stream generated by the pulser of FIG. 4A.

Referring now to FIGS. 4A and 4B, there is shown a pulser 410 having a modified encoder wheel 412 mounted on shaft 413. The encoder wheel 412 includes a plurality of apertures 422 located on its periphery. The apertures are separated by spokes 423. The modified encoder wheel 412 includes the same number of apertures as that shown in FIGS. 2A and 2B. However, this encoder wheel 412 includes a signature aperture 421 whose size is significantly different from the other apertures 422. The pulse stream generated by this encoder wheel 412 is illustrated in FIG. 5. This pulse stream will be referred to as a signature pulse stream. It is composed of a first group of routine pulse transitions 502 of equal length and a second group of signature pulse transitions 504. The signature pulse transitions may contain at least one pulse that is significantly different in size to those in the first group or, as discussed below, may be comprised of a group of pulses of differing sizes.

Figure 6A:
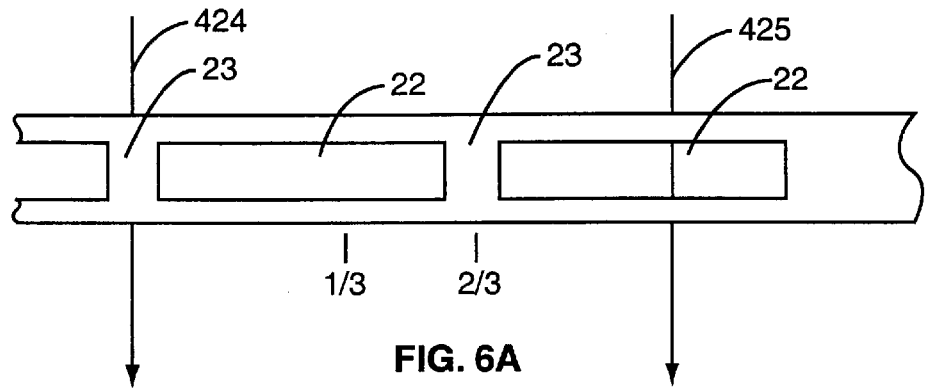
FIG. 6A is a schematic of the routine aperture spacing of an encoder wheel.

In this embodiment, the signature pulse 504 is larger, i.e., has a longer time duration, than the other pulses 502 in the pulse stream. The optimal sizing of the signature aperture 421 relates to several factors including the size of the other apertures on the encoder wheel 412, the mechanism used to detect pulses, and any variations in the product flow rate at a substantially steady state condition. A significant factor, however, is the spacing between the pair of light beams 424,425 used to generate the pulses. As discussed above and shown in FIG. 6A, the normal light beam spacing used in the '788 patent system is such that if one beam is covered by a spoke 23, then the other lies at the midpoint of the adjacent aperture 22. This relationship is achieved by placing the beams apart by 1½ times the routine aperture 22 spoke spacing. In other words, the routine spoke spacing is ⅔ of the distance between the beams 424 and 425. Obviously, this spoke spacing is not desirable for the signature aperture 421 of the present invention because the signature aperture 421 must be significantly different from the routine apertures 422.

Figure 6B:
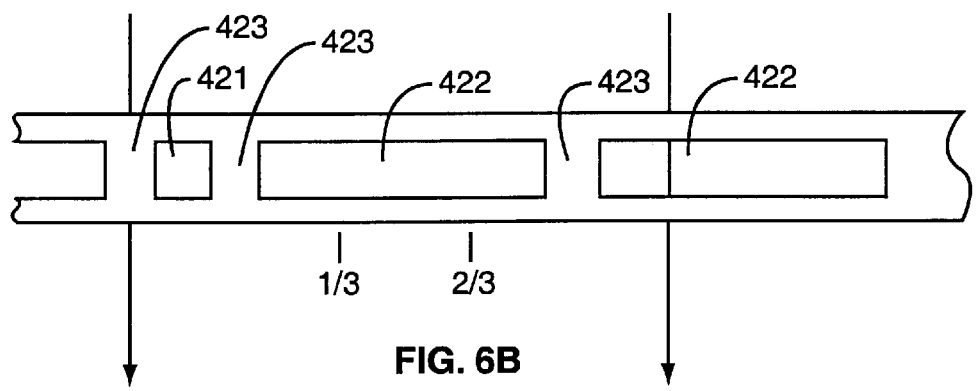
FIG. 6B is a schematic of an encoder wheel having a signature aperture that is smaller than the routine apertures.

Various performance tradeoffs are encountered as the signature aperture 421 is increased or decreased from the size of the routine apertures 422. As shown in FIG. 6B, if the spoke spacing of the signature aperture 421 is decreased from the normal spoke spacing of the routine apertures 422, the mechanical hysteresis is significantly reduced. In fact, as the spoke spacing of the signature aperture 421 gets smaller, the mechanical hysteresis approaches zero. But the loss of hysteresis makes the encoder wheel 412 more sensitive to jitter and may result in extra pulses that are produced in error. Therefore, the size of the signature aperture 421 desirably is not decreased from the routine aperture 422 sizing, which is ⅔ of the beam spacing.

Figure 6C:
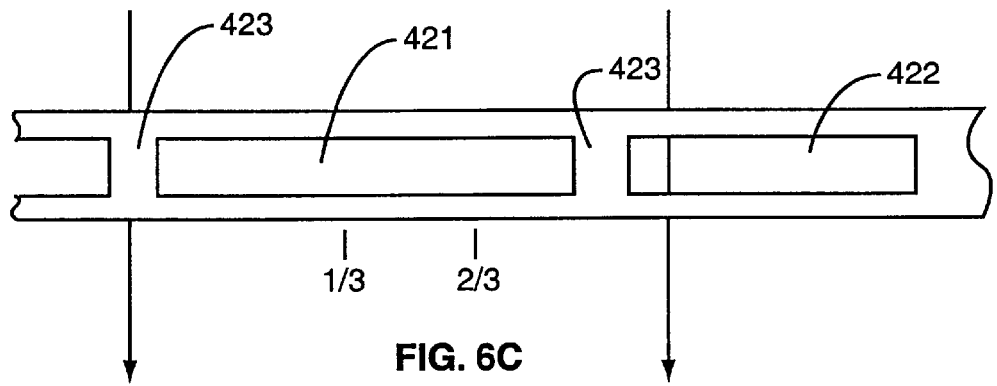
FIG. 6C is a schematic of an encoder wheel having a signature aperture that is larger than the routine apertures and smaller than the spacing of two light beams.

If the size of the signature aperture 421 is marginally increased from the normal spoke spacing of the routine apertures 422, as shown in FIG. 6C, the same negative effect occurs. The mechanical hysteresis is reduced as the middle spoke approaches the unblocked beam 425. This causes the encoder wheel 412 to be very unstable in that region because wheel jitter may tend to generate erroneous pulses. Also, marginally increasing the size of the signature aperture 421 makes detection of the signature pulse 504 more difficult, particularly in an environment that does not have an absolutely steady pulse rate. Therefore, the size of the signature aperture 421 should not be sized between ⅔ of the beam spacing and the complete beam spacing.

Figure 6D:
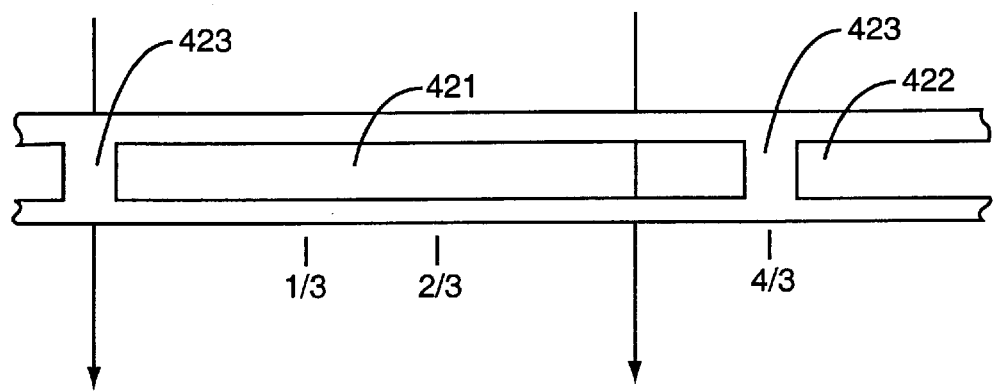
FIG. 6D is a schematic of an encoder wheel having a signature aperture that is larger than the routine apertures and larger than the spacing of the light beams.

The inventors have found that the optimal signature aperture 421 size is about twice the size of the routine apertures 422, as shown in FIG. 6D. When the signature aperture 421 is sized in this manner, the mechanical hysteresis is the same as that of the portion of the wheel including the routine apertures 422. Further, the signature aperture 421 can be detected readily because the signature pulse 504 is significantly larger than the routine pulses 502.

While the wheel aperture spacing described above represents an optimal approach, the practice of the present invention includes using other aperture sizes. These sizes may provide less stable results, but are included in the scope of the present invention, which, in its broadest sense, includes using a signature aperture that creates a cognizably different pulse that can be detected as described hereinbelow.

Use of the modified pulse stream generated by the encoder wheel 412 requires system components that cooperate to recognize the signature pulse stream. These components could include, but are not limited to, the following items:

Speed Qualifier: a means to permit searching for signature pulses 504 in the pulse stream only after the encoder wheel 412 has come up to a minimum acceptable speed and after that speed is stable;

Routine Pulse Period Detector: a means to determine the length of the routine pulse periods 502 between signature pulse periods 504;

Signature Pulse Period Detector: a means to determine the length of the signature pulse periods 504;

Routine Pulse Event Counter: a means to determine the number of routine pulses 502 that occur between signature pulses 504;

Target for Routine Pulses: a means to determine a value equal to a number of correct routine pulses 502 based on the construction of the encoder wheel 412;

Signature Pulse Event Counter: a means to determine the number of times that the signature aperture portion of the encoder 412 wheel has passed;

Valid Signature Counter: a means to determine the number of times that a valid digital pulse stream signature has been detected; and Evaluation Criteria: a means for comparative evaluation of the results that are derived from the above processes and allowing for irregularities that may occur due to fluctuating speed or other forms of non-ideal inputs. The evaluation criteria may be based on minimal acceptable limits, which indicate that the valid pulse stream is typically occurring. This may be based on a percentage basis or on a cumulative transaction basis.

Figure 7:
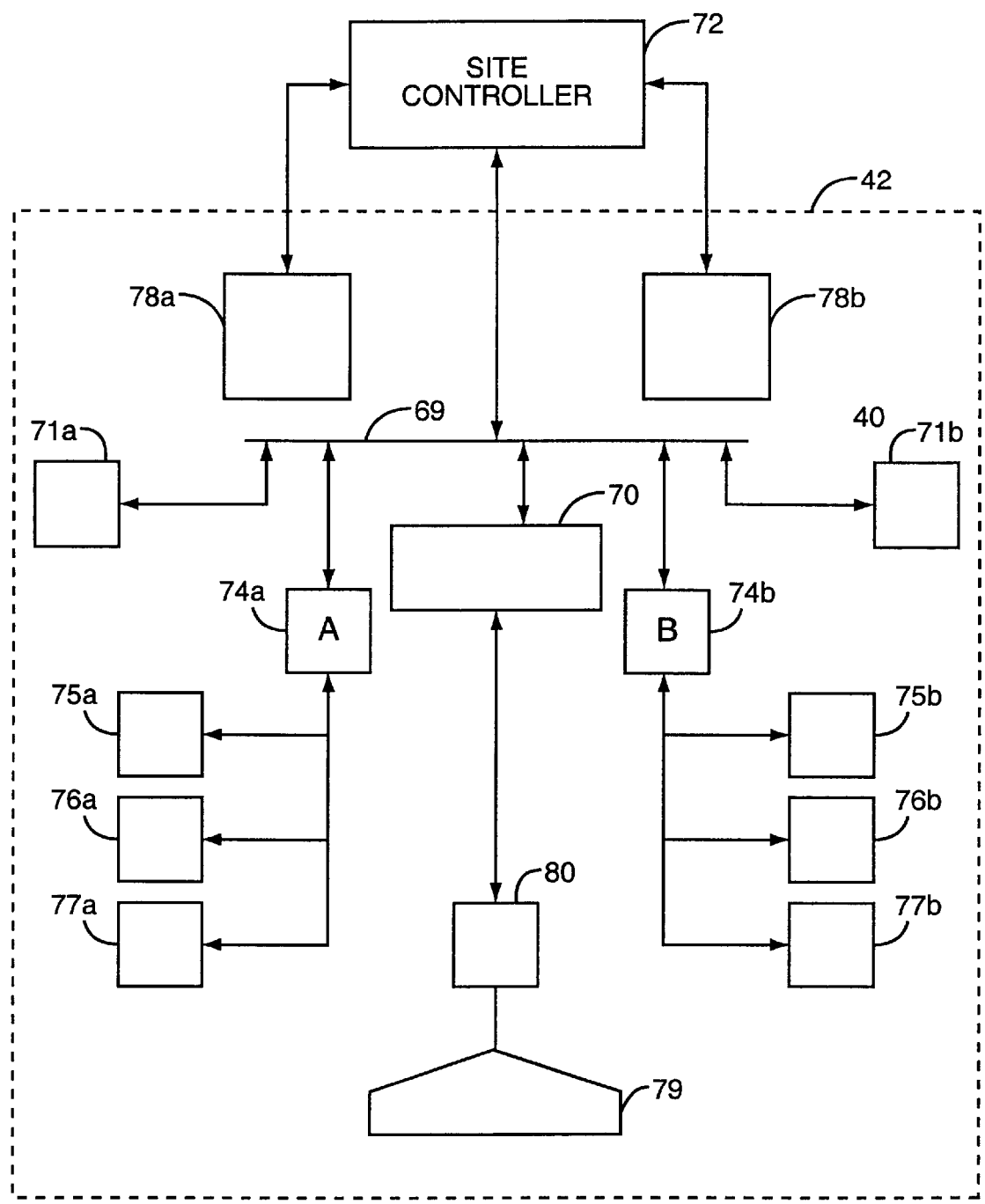
FIG. 7 is a block diagram of the fuel dispenser electronics according to a preferred embodiment of the present invention.

FIG. 7 is a block diagram of the dispenser electronics 14 of a preferred embodiment of the present invention. The dispenser electronics includes a site controller 72 such as one adapted to work with a CRIND® controller available from Gilbarco, Inc. The site controller 72 is in direct electronic communication with information displays 78a, 78b located on opposing sides of the dispenser. These opposing sides will be referred to as an "A" side and a "B" side. The displays 78a, 78b are used for providing customers with operating instructions and sales information during a fueling transaction. The site controller 72 and dispenser microprocessor are in electronic communication with a LON bus 69. The configuration of the LON bus and its operation can be as described in U.S. Pat. No. 5,602,745 assigned to Gilbarco, Inc., the disclosure of which is incorporated herein by reference. The dispenser further includes peripheral microprocessors 74a,74b for servicing transaction displays 75a,75b, printers 71a,71b, keypads 76a,76b, and card readers 77a,77b. The peripheral microprocessors 74a,74b further communicate with the site controller 72 as needed and with the dispenser microprocessor 70 to obtain transaction data concerning the quantity of fuel dispensed for presentation on the transaction displays 78a,78b. The site controller 72 contains two main application tasks, one for each side of the dispenser 42 and various individual communication tasks to allow the transmission and receipt of data with the peripherals connected to the site controller 72. It will be appreciated that other fuel dispensing control schemes may be employed in the practice of the present invention. The architecture just described is exemplary only and should not be construed as limiting to the claimed invention. Meter 79 includes a pulser 80 the provides a pulse stream to dispenser microprocessor 70.

One embodiment of the present invention counts the actual number of routine pulses that occur between signature pulses and compares that count to a predetermined target number. Each occurrence of a match between the actual and target number constitutes a valid signature. If a sufficient number of valid signatures are detected during the dispensing of a certain amount of fuel, then the fueling operation is permitted to continue. If not, then the fueling operation is either halted or other preventative steps are taken, as described below.

In the embodiment discussed below, it will be assumed that the pulser 410 is arranged to generate 1,000 pulses per gallon (or some other unit of measure) of fuel dispensed. Also the encoder wheel 412 may include twenty-four routine apertures 422 and one signature aperture 421, making a total of twenty-five apertures on the encoder wheel 412. Thus, the encoder wheel 412 completes twenty full rotations per gallon in order to generate 1,000 pulses per gallon and completes eight full rotations for every 1/20 gallon. In this embodiment the routine searches for the signature pulse 421 every 1/20 gallon of fuel that is dispensed. However, the routine may be configured to search for the signature pulser 421 at any increment of fuel being dispensed.

As noted above, the number of pulses generated by the pulser 410 depends on the volume of fuel dispensed from the meter, however, the length of the pulses may vary, depending on the fuel flow rate. The more the length of the pulses varies, the more difficult it may be to distinguish the routine pulses 502 from the signature pulses 504. Typically, higher flow rates ensure a more uniform pulse pattern. Thus, the detection process for identifying the signature pulse stream is initiated after the product flow rate reaches and maintains a minimum steady flow which could be, for example, 10 gallons per minute. Alternatively, the detection process could be started immediately with the results of that process not being used to control dispenser operation until after a minimum flow rate had been attained.

Figure 8A:
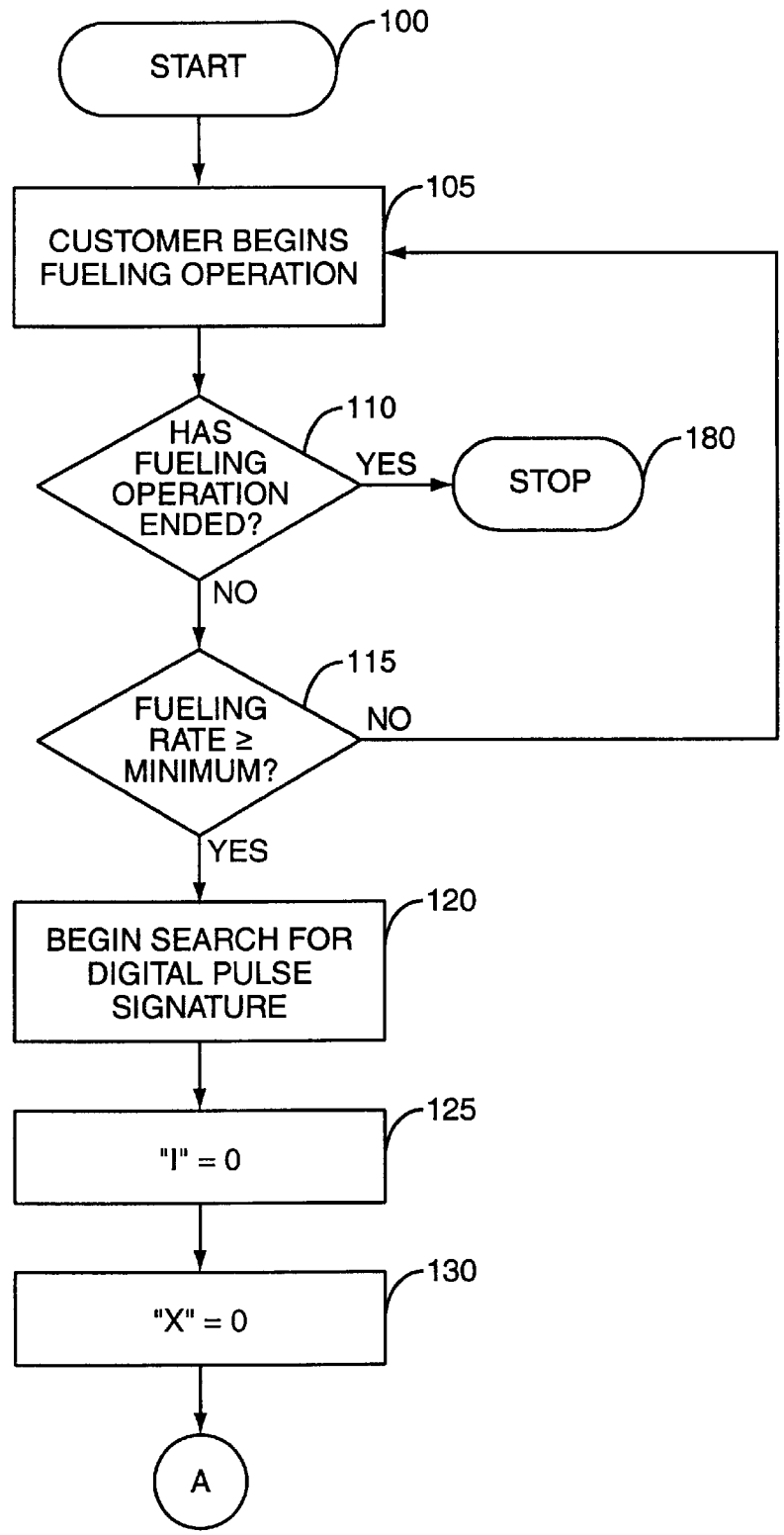
FIGS. 8A–8C are a flow chart of the process of detecting a signature pulser.
Figure 8B:
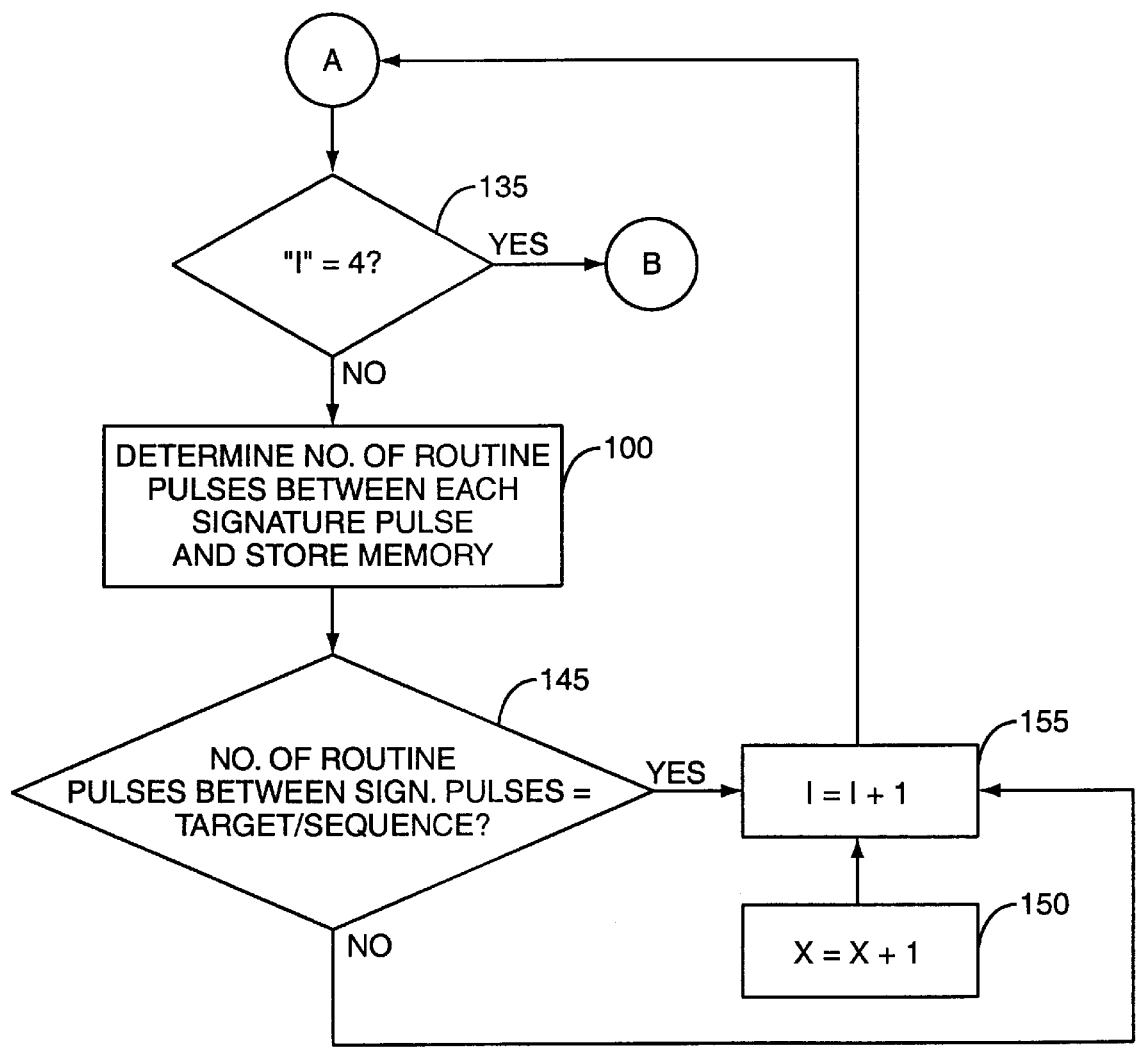
Figure 8C:
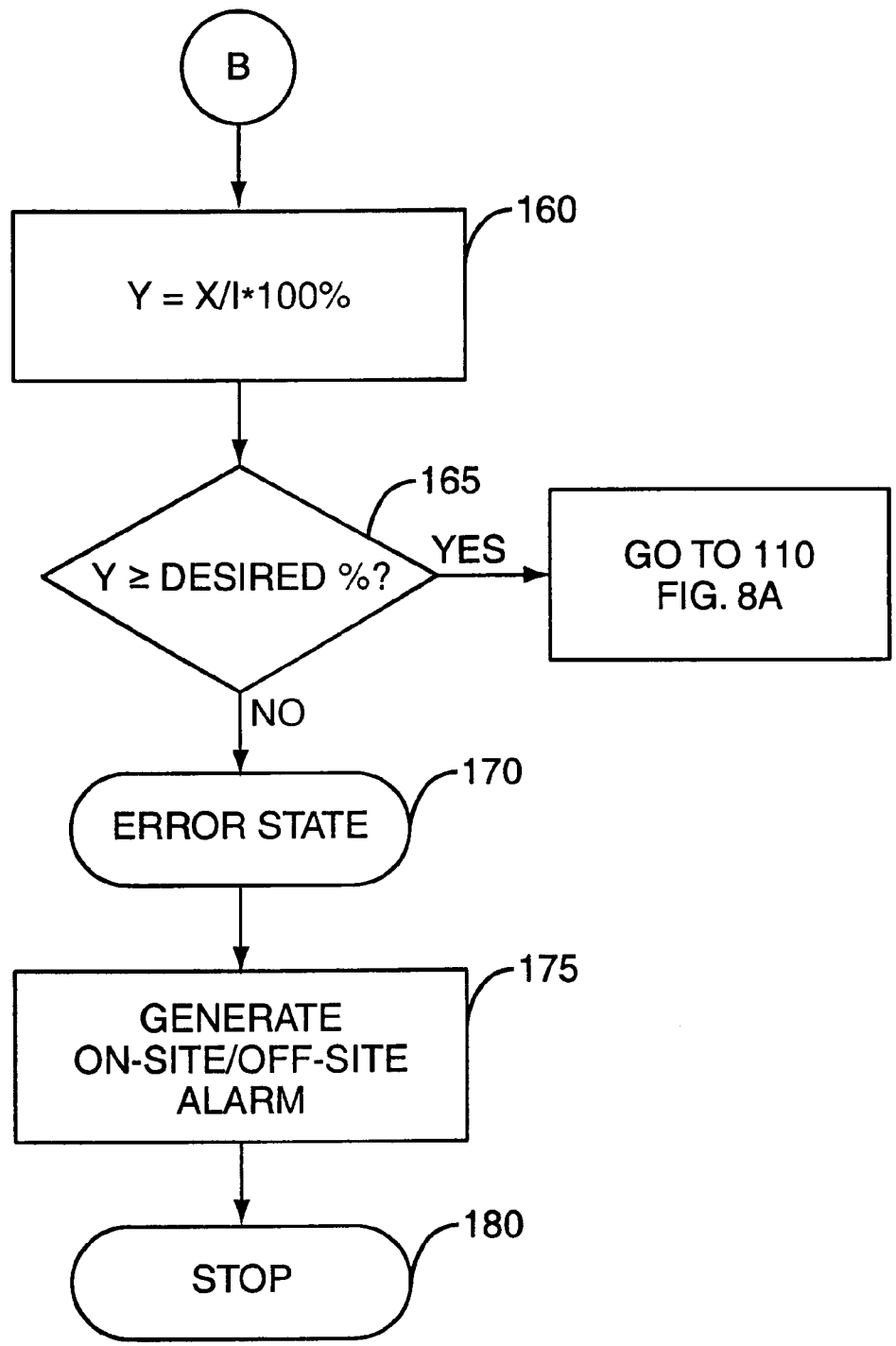

FIGS. 8A–8C illustrate a routine for detecting tampering with a fuel dispenser digital pulse stream. The routine begins 100 when the customer initiates the fueling operation (block 105). Query 110 then determines whether the customer has ended the fueling operation. If the customer has ended the operation, the process stops (block 180). However, if the customer is still fueling, the routine proceeds to query 115 to determine whether the fueling rate is above a predetermined minimum.

If query 115 answers that the fueling rate is not above the predetermined minimum, the routine returns to query 105 to determine whether the customer has ended the fueling operation. If the fueling rate is above the predetermined minimum, the routine begins searching (block 120) for an output generated by a signature pulser. As discussed elsewhere herein, not every embodiment of the present invention requires the detection of a minimum, substantially steady state flow condition. Accordingly, this step is optional in the practice of the present invention.

Next, counters "I" 125 and "X" 130 are set to zero. The first of these counters tracks the number of complete rotations of the encoder wheel 412. The second counter tracks the number of valid signature pulses that are detected in the incoming pulse stream. At query 135 (FIG. 8B) it is determined whether the encoder wheel 412 has made eight full rotations, which corresponds to 1/20 gallon. If the encoder wheel 412 has not fully rotated eight times, the routine determines the number of routine pulses 502 or pulse sequences that occur between each signature pulse 504 in the pulse stream and stores that number in a temporary memory buffer in step 140. There is established a predetermined target number or target sequence that represents the correct number of routine pulses 502 that should occur between each signature pulse 504. Based on the example discussed above, wherein the encoder wheel 412 has twenty-four routine apertures 422 and one signature aperture 421, the target number would be "24", representing the number of routine pulses 502 that should occur between each signature pulse 504.

In an alternative embodiment the encoder wheel 412 may be provided with three signature apertures 421 selectively positioned on the encoder wheel to produce a target sequence such as "9,5,7". This exemplary sequence expects nine routine pulses 502 between first and second signature pulses 504, five routine pulses 502 between second and third signature pulses 504, and seven routine pulses 502 between the third and fourth (recurrence of the first pulse) signature pulses 504.

At query 145, the number or sequence stored in the temporary memory buffer 76 is then compared to the target number or target sequence.

When that number or sequence matches the target number or target sequence, a valid pulse stream is counted and the "X" counter is incremented by one in block 150. The "I" counter is then incremented by one to indicate that the encoder wheel 412 has fully rotated one time 155. On the other hand, if the number or sequence stored in the temporary memory buffer is not equal to the target number or target sequence, only the "I" counter is incremented by one to indicate that the encoder wheel 412 has fully rotated one time. Incrementing I without incrementing X is an indication that either false pulses have been inserted into the pulse stream, there was an error in deriving the signal, or the pulse stream was irregular due to a fluctuating fuel flow rate. The routine just described and shown in FIG. 8B continues until the "I" counter reaches a value of 8. During this time the "X" counter is incremented by one for every match between a target and an actual pulse number or sequence.

When the counter "I" reaches a value of 8 (or some other predetermined number), the routine proceeds to 160 (FIG. 8C) to determine the percentage of valid pulse streams that were detected during the eight rotations of the encoder wheel 412. For example, if a valid pulse stream was detected six times during the eight rotations, then a valid pulse stream was detected 75% of time. If the percentage of valid pulse streams detected meets a predetermined percentage value as determined by query 165, the data from the encoder wheel 412 is considered valid and the fueling process is permitted to continue. The routine then returns to 110, where it is determined whether the customer has ended the fueling operation 110. However, if the percentage value does not meet the predetermined value, then, an error is flagged in block 170. As one of many options, the fueling operation may be halted (block 170). Alternatively, an output signal or alarm 175 is generated to notify the customer and/or operating personnel via one of the displays 78a,78b (See FIG. 7).

Alternatively, the output signal may be forwarded to an offsite monitoring location. For example, it may be communicated by site controller 72 to a remote central controller (not shown) that forwards the information on a network. This option may be desirable if it is felt that operating personnel may be cooperating with those attempting to tamper with the fueling process. It may be desirable to permit fueling operations to continue even after the tampering is discovered so that the remote monitoring or diagnostics location may contact the proper authorities. The routine then stops at 180.

Figure 9:
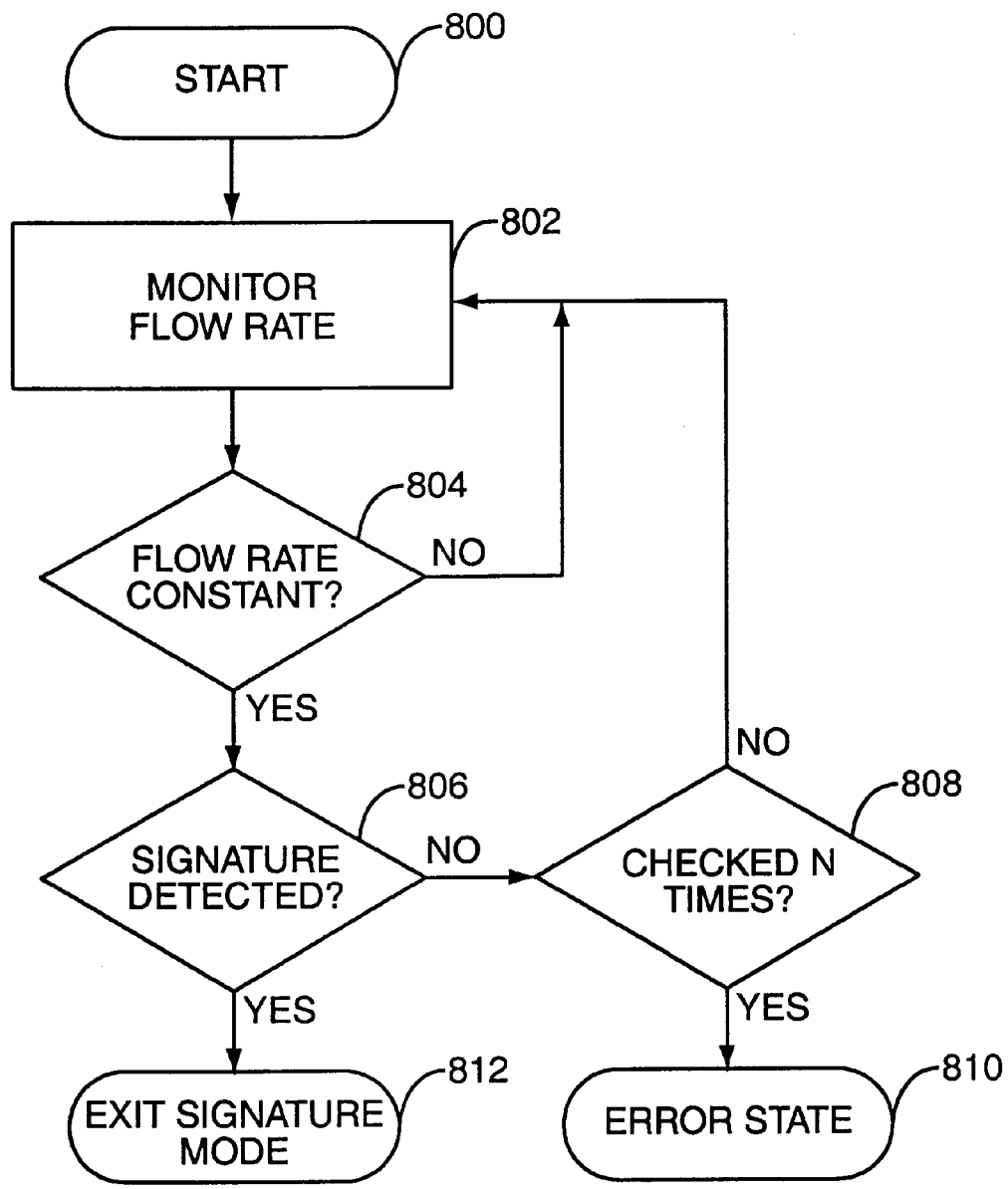
FIG. 9 is a flow chart of a routine for monitoring fuel flow rate prior to detecting a signature pulse stream or other electronic signal.

An alternative embodiment for monitoring the pulse train is illustrated in FIG. 9. This routine starts (block 800) by monitoring the product flow rate (block 802). Query 804 asks whether the flow rate is substantially constant. If the flow rate is not constant then the routine continues the monitoring function. Once the flow rate is constant, and, alternatively has reached a predetermined minimum flow rate, then query 806 determines whether a signature has been detected. If a signature has not been detected, then query 808 determines whether a pulse train has been checked a predetermined number of times for a signature. If this query answers yes, then the routine returns error state 810. This error state 810 could be indicative of one of many faults. By way of non-limiting example, an improper pulser that does not generate the desired signature could be installed in the dispenser. Alternatively, a "block box" tampering device may have been installed in the dispenser to add additional pulses to the incoming pulse train and thus corrupt the signature. Lastly, this error state may not indicate tampering at all, but could indicate some type of malfunction with the pulse generator.

If query 806 returns a positive answer that a signature was detected, then this routine would be exited. It is anticipated that this routine may be used with the routine illustrated in FIGS. 8A–8C. In that case, rather than exiting a signature mode (block 812), the routine illustrated in FIG. 8A would be started.

Figure 10:
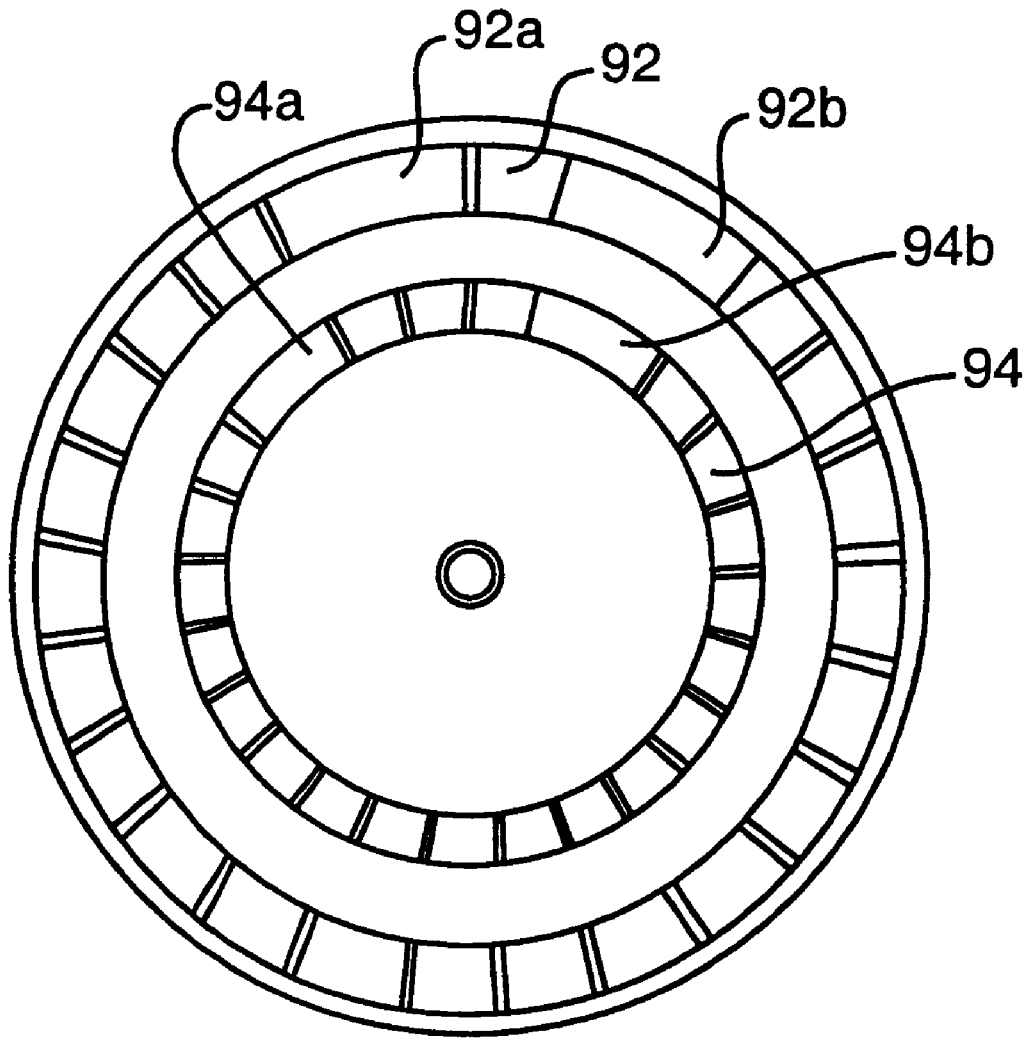
FIG. 10 is a plan view of an encoder wheel having two sets of apertures to include two sets of differing signature apertures.
Figure 12:
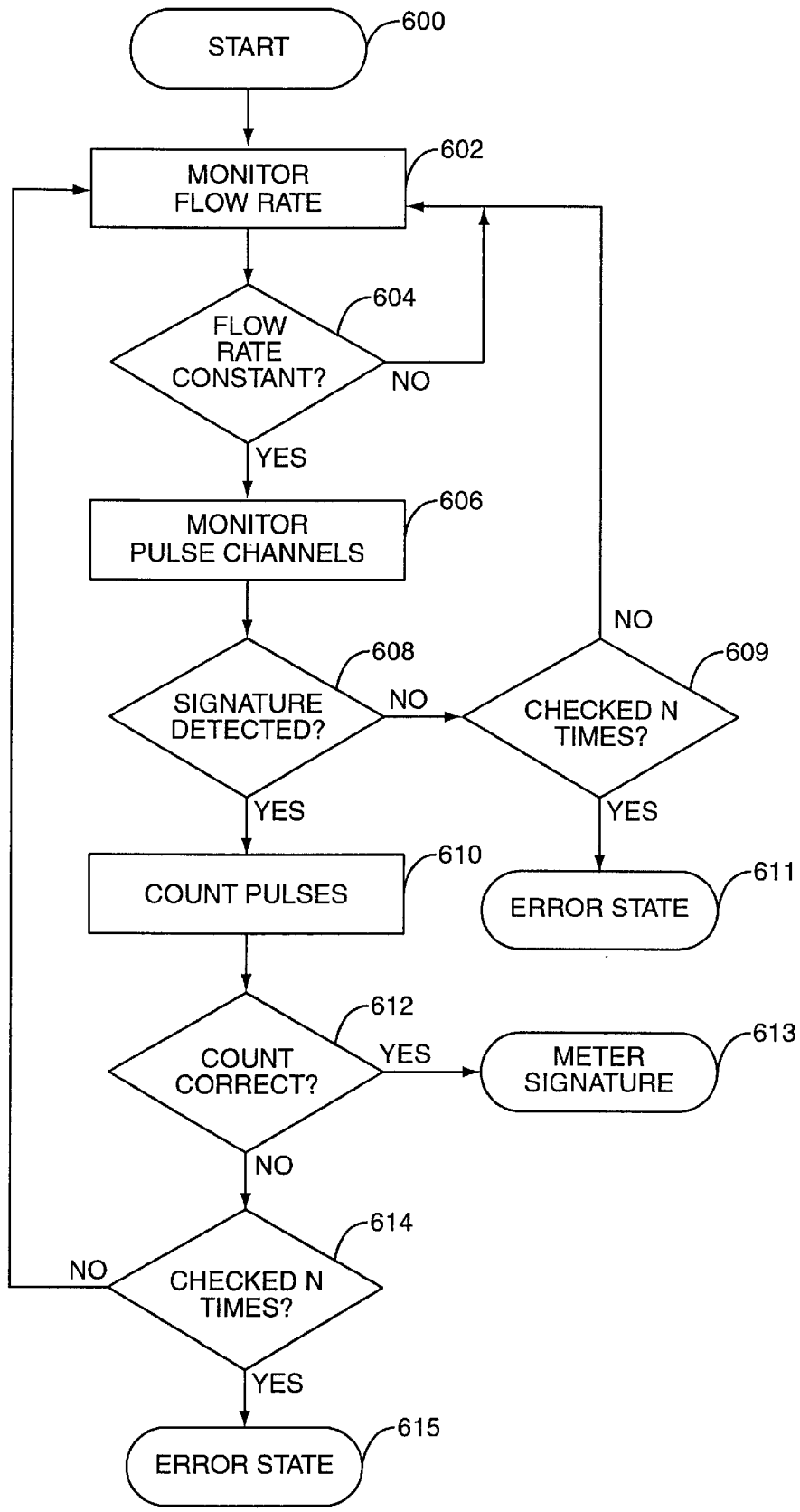
FIG. 12 illustrates an alternative embodiment of the process of detecting tampering with a fueling operation.

A particularly preferred embodiment of the present invention is illustrated in FIGS. 10–12. FIG. 10 illustrates a "quadrature" encoder wheel 90 which includes a first set of apertures 92 and a second set of apertures 94. There are also provided signature apertures 92a,92b,94a,94b in the first and second sets of apertures. The aperture sets are positioned such that, as the encoder wheel rotates, it outputs two data bits or output channels that progress in binary order. A suitable pulser of this type is available from Oak Grigsby of Sugar Grove, Ill. The standard version of the Oak Grigsby 900 Series generates the two-channel waveform illustrated in FIG. 11A. The two waveforms 200,202 are identical but are separated by a 90°-phase difference 204. The encoder wheel generates 32 pulses per channel, per revolution. Accordingly, a total of 1,024 pulses per gallon are created. It will be readily appreciated that the two channels produce a binary output of 00, 01, 11, 10, 00 and so on. The two-channel approach is useful for indicating backward flow through a meter, in which case the output just described would be reversed. Two exemplary illustrations of "signature" modifications to the output illustrated in FIG. 11A are illustrated in FIGS. 11B and 11C. FIG. 11B illustrates two-channels 206,208 one of which has been modified to include a signature anomaly 207 so as to produce a periodically occurring variant output. It will be readily appreciated that the signature anomaly 207 causes the encoder wheel to return periodically the binary code 00,01,11,10. When there has been no tampering, this anomaly will appear once during each encoder wheel rotation. FIG. 11C illustrates two channels 210,212 that include a periodically occurring variance resulting from the periodic varying of the pulse widths in each output channel. This variance includes in each output channel one wide pulse 214a,214b and one narrow pulse 216a,216b in region 211.

The software and dispenser electronics 14 may examine the incoming pulse streams in various ways. By way of example, there could be a search for the presence of some type of pulse anomaly during each rotation of the encoder wheel with the anomaly separated by a predetermined number of routine pulses. Second, each occurrence of one of the anomalies just described could be examined to insure that it matches a predetermined "signature." If the software failed to detect either one or both of these items during at least some portion of a fueling operation, then an error state would be indicated and appropriate action would be initiated. It will be readily appreciated that the term "signature" as used herein relates both to detecting the presence of an identifying anomaly at predetermined intervals among routine pulses and, to examining the anomaly itself to determine if it contains an expected signature.

An exemplary routine for this embodiment is depicted in FIG. 12. The routine starts (block 600) by monitoring the product flow rate (block 602). Query 604 determines whether the flow rate is constant or substantially constant. If the query answers yes, then the combined incoming pulse channels are monitored (block 606). It should be appreciated that, for this multi-channel embodiment, this portion of the routine is optional. This is because a substantially constant flow rate is not necessary for the examination of the binary output.

Query 608 determines whether the proper binary "signature" has been detected. In particular, the routine searches for one of the binary combinations described above. If this query answers no, then query 609 determines whether the pulse stream has been checked a predetermined N number of times. As was discussed above, generating an alarm condition may not be desirable immediately after the first instance that a pulse signature is missed. The missing pulse signature could have other causes such as signal noise. If the predetermined number of checks has not been made (block 609), and then the routine returns to block 602. If query 609 answers yes, then an error state 611 has been detected.

If query 608 answers yes, then a digital pulse signature has been detected and counter step 610 counts the number of pulses until the next signature is received. Query 612 then determines whether that count is correct. If the count is correct, then a proper meter signature 613 has been detected. If query 612 answers no, then query 614 determines whether the incoming pulse streams have been checked a predetermined N number of times. If this query answers no, then the routine returns to block 602 to monitor product flow rate. If this query answers yes, then the routine returns error state 615.

Although the present invention has been discussed to this point in terms of an electronic signal generated by a pulser, the practice of the invention includes the use of other "signature" electronic signals. One such signal is the characteristic signal developed by certain types of positive displacement meters used in fuel dispensers. For example, piston-type positive displacement meters measure volume by counting the cyclic displacement of pistons as fluid flows therethrough. The pistons reciprocate through cylinders whose volume has been determined very accurately. It has been discovered that even at a "constant" flow rate, the cyclic action of the pistons causes minute, measurable fluctuations in flow rate. Further, it has been discovered that for a given meter model, these fluctuations are constant from meter to meter and can be used as a characteristic, identifying anomaly for that particular model.

Figure 15:
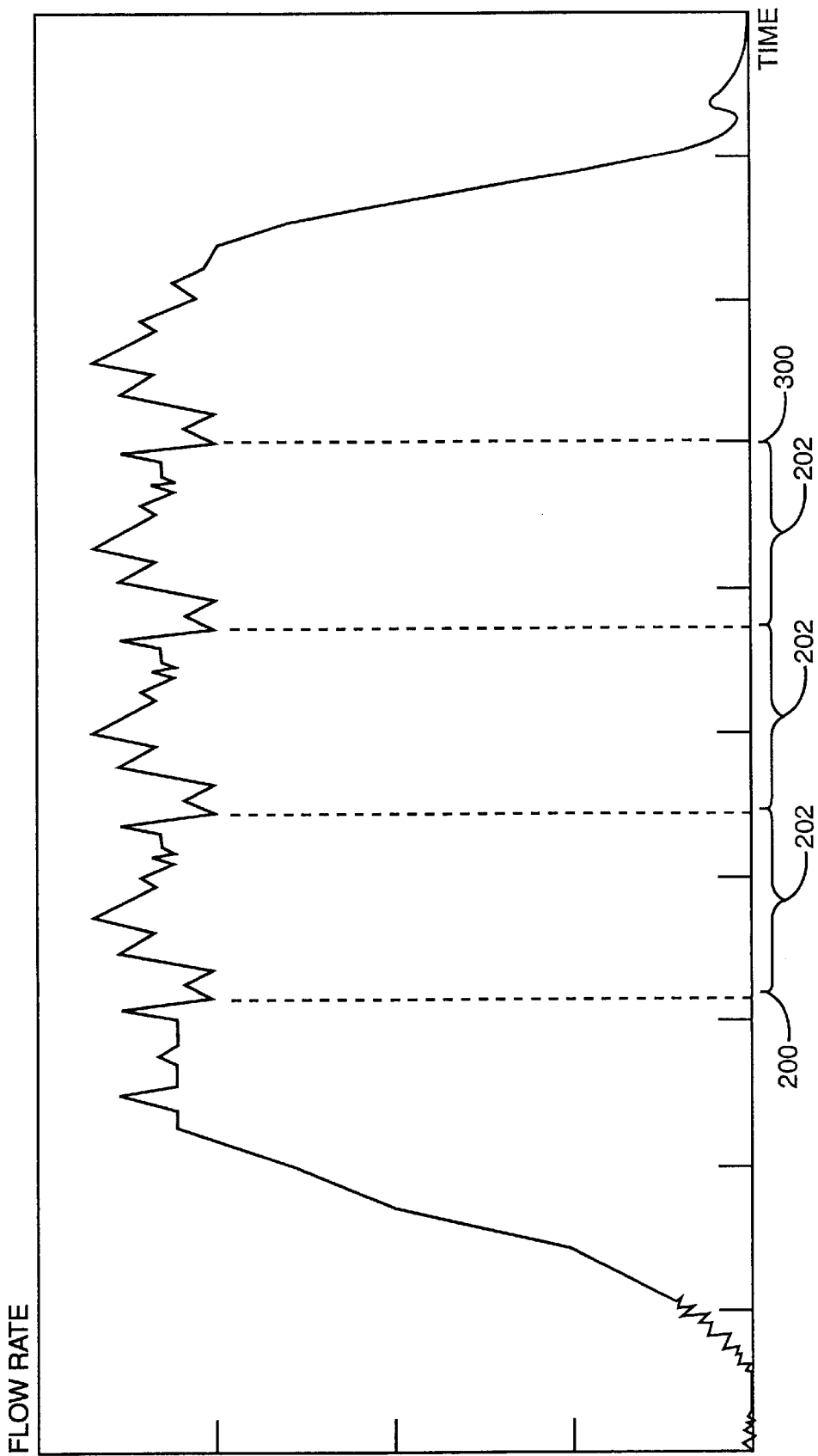
FIG. 15 is a graphical representation of the flow rate variation pattern typical of a positive displacement, piston-type flow meter.

FIG. 15 is a graphic representation of this phenomena. The horizontal axis represents time and the vertical axis represents flow rate. The graph illustrates flow rate as it is increased from 0 up to a substantial constant of approximately 10 gallons per minute. The period of substantially constant flow starts at the point indicated at 200 and extends to the point indicated at 300. What typically appears as a "constant" flow rate can be seen to be a repeating pattern of minor variations in flow rate. Each cycle 202 has a characteristic flow rate variation caused by the cycling of the pistons in the positive displacement flow meter. A particular model of flow meter will have an identifying flow rate pattern anomaly that may be stored in a memory device and compared to the actual flow rate pattern generated by a meter during use.

Once the length of the characteristic cycle 202 has been determined, the number of pulses generated during that time may be measured. For example, assume that during each cycle 202, 125 pulses are generated. It follows that during a monitored fueling transaction, the electronic signal illustrated in FIG. 15 would be checked to insure that it has the characteristic flow rate pattern and additionally, that approximately 125 pulses are generated during the length of that cycle. It will be readily appreciated that if a larger than expected number of pulses, such as 135 pulses, are counted during the cycle 202 then there could be the possibility of tampering with the fueling operation.

In a preferred version of this embodiment, a history would be maintained of both the observed shape of the flow rate pattern and the number of pulses generated during each cycle 202. This process would be carried out using the same routines as illustrated above. This history can be developed during the course of a single, average-sized fueling transaction of about 8–10 gallons, which typically generates several thousand pulses.

The approach described above may be employed with other types of positive displacement meters.

Each of the embodiments of the present invention described above is capable of generating a unique electronic signal having an identifying anomaly or "signature," storing a digital pulse stream signature in a memory device wherein the signature is substantially similar to the identifying pulse anomaly; comparing the incoming digital pulse stream with the pulse stream signature; and allowing fuel delivery to continue if the incoming digital pulse stream generated by the pulse generator is substantially similar to the digital pulse stream signature. The present invention may further include notifying operating personnel either on site or off site of any error condition via either an audio or visual alarm.

An enhancement to this common approach is to perform the tamper detection routines described above on a random basis. That is, the monitoring of an electronic signal would not be undertaken during each fueling transaction. Rather, the monitoring would be conducted during fueling transactions selected at random and could include installing the monitoring feature in some but not all the dispensers at a particular location. It is believed that this approach would frustrate attempts to tamper with the fueling operation because it would deprive the fraud perpetrator of feedback concerning the success of his efforts. It will be readily appreciated that if the dispensing system were to generate an alarm as soon as a fraudulent electronic signal were detected, then the perpetrator of the fraud would know immediately that an alternative scheme would need to be devised. On the other hand, if a series of error states were detected without notice to the perpetrator, then the tampering activity could be monitored, analyzed and countered effectively. Additionally, this aspect of the present invention provides a "silent alarm" for tampering and affords fueling system owners and regulatory authorities an opportunity to apprehend fraud perpetrators in the act.

Figure 14:
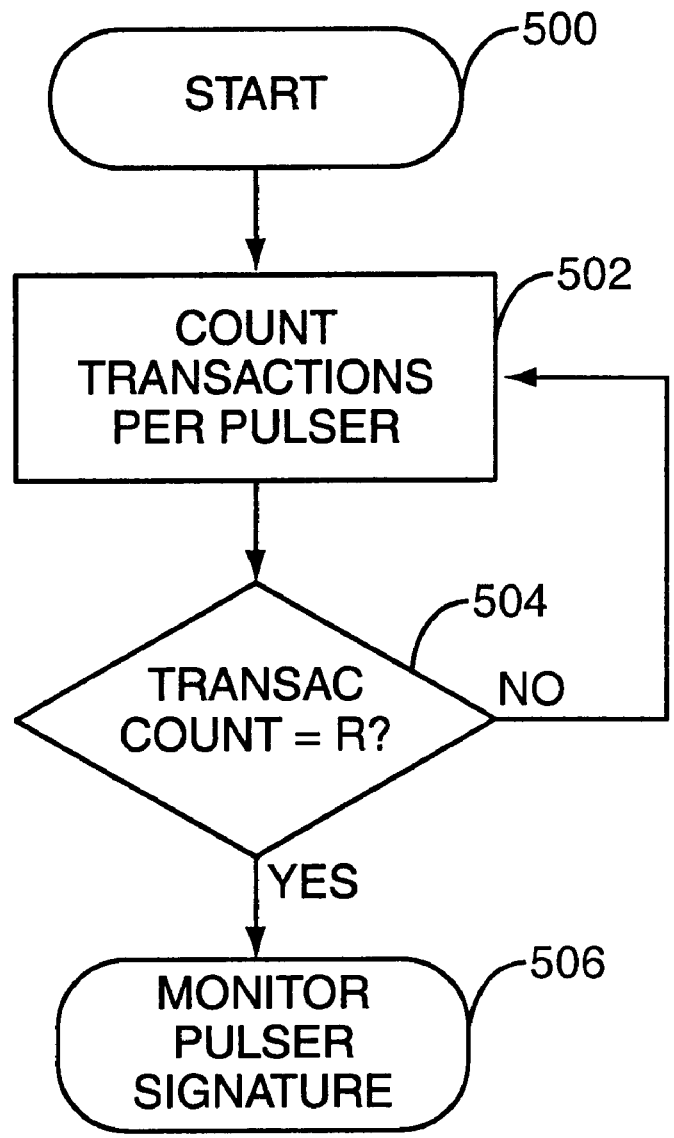
FIG. 14 illustrates a process for randomly selecting a fueling process for monitoring to detect tampering with the digital pulse train or other electronic signal generated thereby.

A routine for this random monitoring function is illustrated in FIG. 14. The routine starts 500 between fueling transactions and counts the number of transactions for each pulser or meter (block 502). Query 504 determines whether the number of transactions equals a randomly selected or preset number R. If that number has not been reached, then the routine continues to count (block 502). If that number of transactions has been reached, then the incoming electronic signal, i.e., a pulse stream or flow rate signature is monitored for a signature (block 506). The random number R may be varied periodically.

Figure 13:
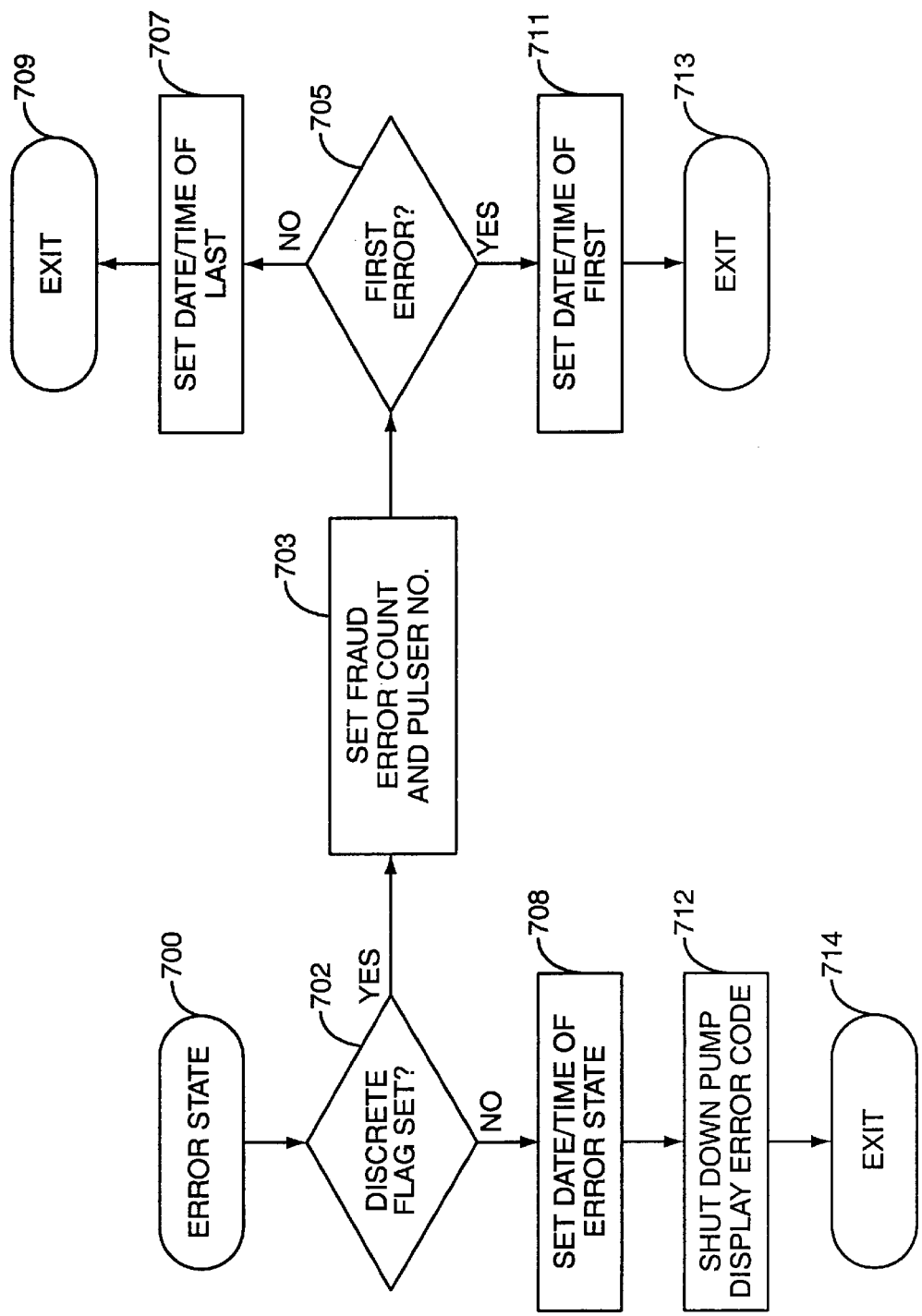
FIG. 13 illustrates an alternative process for detecting tampering with a fueling operation.

A method for managing the results of any of the types of monitoring described above is illustrated in the flow chart in FIG. 13. This routine begins with error state 700 that could be any one of the error states described above. Query 702 determines whether a discrete flag has been set. The discrete flag refers to a predetermined decision as to whether or not a fuel dispenser will be shut down soon after an error state has been detected. If no discrete flag has been set, then the date and time of the error state is recorded (block 708) and the dispenser is shut down (block 712). Additionally, an appropriate error code may be displayed on either a customer display at the dispenser or in a display provided to operating personnel. The routine exits at 714.

If a discrete flag has been set in query 702, then a fraud error counter is set, and the pulser number for the particular pulser involved is recorded (block 703). The pulser number can be stored in the dispenser electronics for recall as needed. Next query 705 determines whether this error state is the first detected for this particular pulser. If it is then the date and time of the first error state is set (block 711). The routine then exits 713. If the error state is not the first error, then the routine sets the date and time of the last error state (block 707). As additional error states or instances of tampering are detected, and then the date and time of the most recent occurrence will be updated, overwriting the most recently saved information in block 707. The routine then exits at block 709. Alternatively, the history can be build by adding the data to a memory device.

The data concerning the detected error states may be accessed by remote diagnostics functions for monitoring tampering activity. The term remote as used herein includes monitoring the operation of a fuel dispenser from an operator's station at a fueling location and additionally monitoring multiple locations from a centralized monitoring location.

In another preferred embodiment of the present invention, a retrofit kit may be provided to upgrade existing fuel dispensers. The pulser that is used in most fuel dispensers includes the encoder wheel described in the '788 patent having equally spaced and equally sized routine apertures 22. A retrofit kit according to the present invention includes a modified pulser having one of the encoder wheel embodiments described above. The retrofit kit would include software for reconfiguring the dispenser electronics of current fuel dispensers to recognize an identifying pulse anomaly. The software includes the items discussed above, such as a speed qualifier, routine pulse detector, signature pulse detector, target number or target sequence, digital pulse signature counter, valid pulse stream counter, and/or evaluation criteria. The software is easily installed and enables the dispenser to detect pulse stream tampering and to communicate tampering events to on-site or off-site personnel or monitoring equipment.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

We claim:

1. A method for detecting tampering with a fuel dispensing operation comprising:
    a. generating an electronic signal as a fuel is dispensed to a customer wherein the electronic signal has an identifying anomaly for allowing fueling operations and wherein the signal is related to the volume or flow rate of fuel dispensed;
    b. comparing the generated signal to an expected signal signature with an expected anomaly signature;
    c. allowing fuel dispensing to continue if the generated signal is substantially similar to the expected signal and anomaly signature.

2. The method of claim 1 further comprising stopping fuel dispensing if the generated signal is not substantially similar to the expected signal signature.

3. The method of claim 1 wherein the generated signal is a digital pulse stream indicative of the volume and flow rate of fuel dispensed.

4. The method of claim 3 wherein the generated signal is comprised of a first set of pulses having a first size and the anomaly is at least one pulse having a different size from that of the first set of pulses.

5. The method of claim 3 wherein the generated signal is comprised of a first set of pulses having a first size and the anomaly is a second set of pulses having a different size from that of the first set of pulses wherein the second set of pulses is interspersed among ones of the first set.

6. The method of claim 1 wherein the generated signal is a signal indicative of a fuel flow rate variation characteristic of a particular flow meter.

7. A method for detecting tampering with a fuel dispensing operation comprising:
    a. generating a digital pulse stream related to the volume or flow rate of fuel dispensed wherein the pulse stream includes an identifying pulse anomaly for allowing fueling operations;
    b. comparing the incoming digital pulse stream with an expected digital pulse stream signature and an expected anomaly signature; and
    c. allowing fuel delivery to continue if the digital pulse stream is substantially similar to the pulse stream and anomaly signature.

8. The method of claim 7 further comprising the steps of:
    a. determining a rate at which fuel is being dispensed; and
    b. comparing the incoming digital pulse stream with the expected pulse stream signature only when said rate is equal to or greater than a predetermined minimum.

9. The method of claim 7 further comprising stopping fuel delivery if the incoming digital pulse stream does not contain the identifying pulse anomaly.

10. The method of claim 7 wherein the digital pulse stream is comprised of a first set of pulses having a first size and the anomaly includes at least one pulse having a different size from that of the first set of pulses.

11. The method of claim 10 wherein said comparing step includes:
    a. counting the pulses in the first set occurring between each at least one pulse having a different size;
    b. comparing the first pulse set count to a target pulse count wherein the target pulse count equals an expected number of first set pulses occurring between the at least one pulse having a different size.

12. The method of claim 7 wherein the digital pulse stream is comprised of a first set of pulses having a first size and the anomaly includes a second set of pulses having a different size from that of the first set of pulses.

13. The method of claim 12, wherein said comparing step includes:
    a. determining a sequence of numbers wherein each number of the sequence is determined by the number of first set pulses occurring between each of the pulses of the second set; and
    b. comparing determined sequence of numbers to a stored sequence of numbers that represent a predetermined target number of first set pulses that should appear between each pulse of the second set.

14. A method for detecting tampering with a fuel dispenser digital pulse stream during dispensing of a fuel comprising the steps of:
    a. determining a rate at which fuel is being dispensed;
    b. generating a digital pulse stream related to the volume or flow rate of fuel dispensed wherein the pulse stream includes an identifying pulse anomaly for allowing fueling operations;
    c. comparing the incoming digital pulse stream with an expected pulse stream signature and an expected anomaly signature when the fuel flow rate is equal to or greater than a predetermined minimum; and
    d. allowing fuel delivery to continue if the incoming digital pulse stream is substantially similar to the expected pulse stream and anomaly signature.

15. A method for detecting tampering with the dispensing of fuel comprising the steps of:
    a. generating first and second digital pulse streams wherein at least one of the digital pulse streams is related to the volume or flow rate of fuel dispensed and wherein each pulse stream includes first and second identifying digital pulse anomalies respectively for allowing fueling operations;
    b. combining the digital pulse streams to create a combined digital pulse signature;
    c. comparing the combined digital pulse signature with an expected digital pulse signature and an expected anomaly signature; and
    d. allowing fuel delivery to continue if the combined digital pulse signature is substantially similar to the expected digital pulse stream and anomaly signature.

* * * * *